US008620561B2

(12) United States Patent
Murakami et al.

(10) Patent No.: US 8,620,561 B2
(45) Date of Patent: Dec. 31, 2013

(54) CONTROL FOR INTERNAL COMBUSTION ENGINE PROVIDED WITH CYLINDER HALTING MECHANISM

(75) Inventors: Akira Murakami, Saitama (JP); Taro Endo, Saitama (JP); Takaaki Fukusako, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 652 days.

(21) Appl. No.: 12/248,485

(22) Filed: Oct. 9, 2008

(65) Prior Publication Data

US 2009/0118975 A1 May 7, 2009

(30) Foreign Application Priority Data

Oct. 9, 2007 (JP) ................................ 2007-262980

(51) Int. Cl.
*B60T 7/12* (2006.01)
*G06F 17/00* (2006.01)
*F02D 17/02* (2006.01)
*F02D 41/12* (2006.01)

(52) U.S. Cl.
USPC ........ 701/103; 701/112; 123/198 F; 123/325; 123/332; 123/481; 123/493; 60/285

(58) Field of Classification Search
USPC ........... 123/90.15, 198 F, 325, 332, 481, 493; 701/103, 112; 60/285, 286
See application file for complete search history.

(56) References Cited

U.S. PATENT DOCUMENTS 6,289,672 B1 * 9/2001 Katoh et al. .................... 60/285
6,332,446 B1 * 12/2001 Matsumoto et al. ....... 123/198 F
6,470,675 B1 * 10/2002 Lewis et al. ..................... 60/285
6,742,327 B2 * 6/2004 Inoue et al. ..................... 60/285
6,837,042 B2 * 1/2005 Colignon et al. ............... 60/286
6,945,033 B2 * 9/2005 Sealy et al. ...................... 60/285
6,976,356 B2 * 12/2005 Okada et al. .................... 60/286
7,055,311 B2 * 6/2006 Beutel et al. .................... 60/285
7,143,727 B1 * 12/2006 Winstead et al. .......... 123/90.15
7,155,331 B1 * 12/2006 Zhang et al. .................. 701/108
7,204,132 B2 * 4/2007 Reed et al. ................. 73/114.79

FOREIGN PATENT DOCUMENTS

JP 2000-170560 6/2000

* cited by examiner

*Primary Examiner* — Mahmoud Gimie
*Assistant Examiner* — David Hamaoui
(74) *Attorney, Agent, or Firm* — Nelson Mullins Riley & Scarborough LLP; Anthony A. Laurentano

(57) ABSTRACT

A control for an internal combustion engine having a fuel injection valve for directly injecting fuel to a combustion chamber of the engine, an ignition device for burning an air-fuel mixture containing the fuel injected from the fuel injection valve, and a variable cylinder management mechanism that is capable of changing the number of operating cylinders is provided. The control includes making a transition to an operating mode where the number of operating cylinders is decreased through the variable cylinder management mechanism. It is predicted based on an operating condition of the engine that an air-fuel ratio of an exhaust atmosphere of the engine becomes lean due to a stop of the fuel injection into one or more cylinders to be halted by the transition. If it is predicted that the air-fuel ratio of the exhaust atmosphere of the engine becomes lean, additional fuel is injected from the fuel injection valve to the one or more cylinders to be halted after ignition performed by the ignition device in a combustion cycle where the prediction is made.

6 Claims, 7 Drawing Sheets

CONTROL FOR INTERNAL COMBUSTION ENGINE PROVIDED WITH CYLINDER HALTING MECHANISM

BACKGROUND OF THE INVENTION

1. Field of the Invention

The present invention relates to a control for an internal combustion engine provided with a cylinder halting mechanism.

2. Description of the Related Art

There has been an internal combustion engine provided with a plurality of cylinders and a cylinder halting mechanism for halting a part of the plurality of cylinders according to an operating condition of the engine. In such an internal combustion engine, when the number of operating cylinders is decreased, an air-fuel ratio of an exhaust atmosphere may become thin (lean) if air is supplied while fuel injection is stopped in a cylinder to be newly halted. Such lean atmosphere may lower the emission.

Japanese Patent Application Laid-Open (JP-A) No. 2000-170560 discloses a technique where, in order to prevent the lean exhaust atmosphere, an intake valve of a cylinder to be halted is stopped when a predetermined time elapses after an exhaust valve of the cylinder is stopped.

In the above technique, the exhaust valve is stopped prior to the stop of the intake valve to prevent the air from discharging, so that an exhaust air-fuel ratio can be prevented from becoming lean. However, the intake/exhaust valve stop timing possibly fluctuates according to a response characteristic of a mechanism which controls operations of the intake and exhaust valves. Therefore, a deviation may occur between fuel injection stop timing and the intake/exhaust valve stop timing. Particularly, in the case where the intake and exhaust valves are hydraulically operated, there is a probability that such fluctuations may easily occur in the response characteristic. If a deviation occurs between the fuel injection stop timing and the intake/exhaust valve stop timing, the exhaust air-fuel ratio may become lean, which may lower the emission. Accordingly, there is a demand for a new technique of effectively suppressing the lean exhaust air-fuel ratio caused by such a deviation.

Furthermore, in the above technique, in order to more surely prevent the lean exhaust air-fuel ratio, a fuel is increased to an operating cylinder to enrich an air-fuel ratio of the operating cylinder. In this regard, there is a room for improving the fuel consumption.

SUMMARY OF THE INVENTION

According to one aspect of the present invention, a control for an internal combustion engine is provided. The engine comprises a fuel injection valve for directly injecting fuel into a combustion chamber of the engine, an ignition device for burning an air-fuel mixture containing the fuel injected from the fuel injection valve, and a variable cylinder management mechanism that is capable of changing the number of operating cylinders. The control includes making a transition to an operating mode where the number of operating cylinders is decreased through the variable cylinder management mechanism. Based on an operating condition of the engine, a state where an air-fuel ratio of an exhaust atmosphere of the engine becomes lean due to a stop of the fuel injection into one or more cylinders to be halted by transition is predicted. If it is predicted that the air-fuel ratio of the exhaust atmosphere becomes lean, additional fuel is injected from the fuel injection valve to the one or more cylinders to be halted after ignition performed by the ignition device in a combustion cycle where prediction is made.

The inventors focus on the fact that fuel can be injected in any stroke of the combustion cycle in the case of the internal combustion engine where the fuel is directly injected into the combustion chamber. Based on the fact, if it is predicted that the air-fuel ratio of the exhaust atmosphere becomes lean by the stop of the fuel injection into one or more cylinders to be halted in making a transition to the operating mode where the number of operating cylinders is decreased, additional fuel is injected in the combustion cycle where the prediction is made. The combustion cycle generally includes an intake stroke, a compression stroke, an expansion stroke, and an exhaust stroke. For example, the additional fuel can be injected in the expansion stroke or the exhaust stroke. Thus, it is predicted that the exhaust air-fuel ratio is leaned by the stop of the fuel injection into one or more cylinders to be halted during one combustion cycle, and the additional fuel is injected into the one or more cylinders during the same combustion cycle in order to prevent the exhaust air-fuel ratio from being leaned. Therefore, the lean exhaust air-fuel ratio can be suppressed even if the intake/exhaust valves are operated after the stop of the fuel injection for the one or more cylinders to be halted.

In one embodiment, the state where the air-fuel ratio of the exhaust atmosphere becomes lean is a state where a fuel injection is stopped into the one or more cylinders to be halted although intake/exhaust valves of the one or more cylinders to be halted are operated. In one embodiment, an integrated value of a change in a clank angular velocity is compared with a threshold. The state where the air-fuel ratio of the exhaust atmosphere becomes lean is determined if the integrated value is larger than the threshold. In one embodiment, the additional fuel is preferably determined such that the air-fuel ratio of the exhaust atmosphere becomes the theoretical air-fuel ratio.

DETAILED DESCRIPTION OF THE PREFERRED EMBODIMENTS

Figure 1:
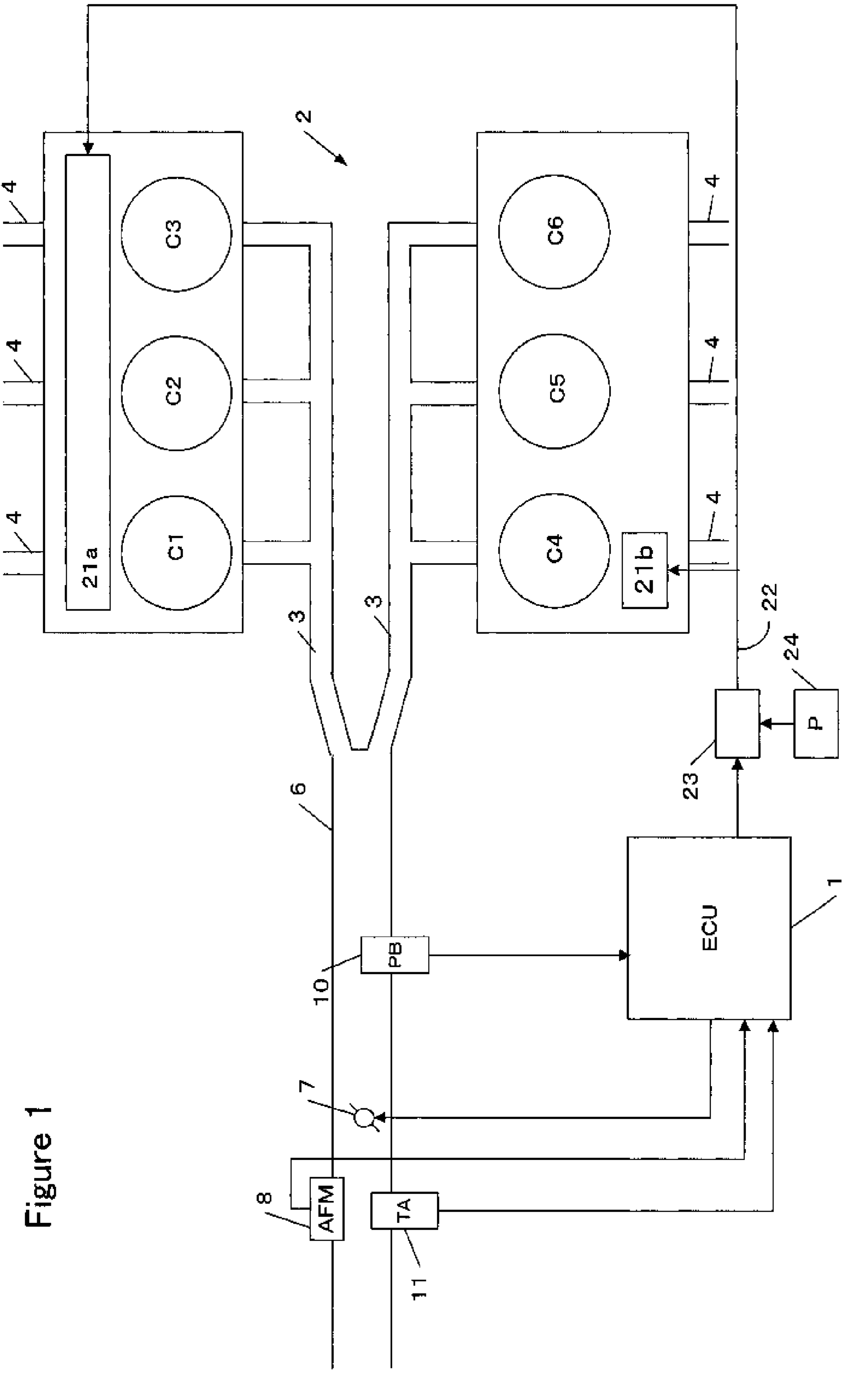
FIG. 1 schematically shows an internal combustion engine and a control apparatus according to one embodiment of the present invention.

An exemplary embodiment of the present invention will be described below with reference to the drawings. FIG. 1 schematically shows an internal combustion engine (hereinafter referred to as engine) and a control apparatus thereof according to one embodiment of the present invention.

An electronic control unit (hereinafter referred to as "ECU") 1 is a computer including a central processing unit (CPU) and a memory. One or more computer programs for implementing various controls of the vehicle and data (including one or more maps) necessary to execute the programs may be stored in the memory. The ECU 1 receives a signal from each part of the vehicle, and ECU 1 generates a control signal for controlling each part of the vehicle by performing computation according to data and one or more programs which are stored in the memory.

An engine 2 is a variable cylinder management engine. The engine 2 includes a first bank having three cylinders C1 to C3 and a second bank having three cylinders C4 to C6. An intake manifold 3 and an exhaust manifold 4 are coupled to each cylinder.

A throttle valve 7 is provided in an intake passage 6 on the upstream of a collecting portion of the intake manifolds 3 of the cylinders. An opening degree of the throttle valve 7 is controlled according to a control signal supplied from ECU 1. The amount of air introduced into the engine 2 can be controlled by controlling the opening degree of the throttle valve 7.

An air flow meter (AFM) 8 and an intake temperature (TA) sensor 11 are provided on the upstream of the throttle valve 7. The AFM 8 detects the amount of air flowing through the intake passage 6. The TA sensor 11 detects a temperature of the intake passage 6. Detection values of the AFM 8 and the TA sensor 11 are sent to the ECU 1. A PB sensor 10 for detecting a pressure (absolute pressure) of the intake passage 6 is provided on the downstream of the throttle valve 7. A detection value of the PB sensor 10 is sent to ECU 1.

A cylinder halting mechanism 21*a* is provided in the first bank, and a cylinder halting mechanism 21*b* is provided in the second bank. The cylinder halting mechanism 21*a* switches between the operation (active state) and the halt (inactive state) for the cylinders C1 to C3. The cylinder halting mechanism 21*b* switches between the operation (active state) and the halt (inactive state) for the cylinder C4. An oil passage 22 is connected to the first and second cylinder halting mechanisms 21*a* and 21*b* for the cylinder-halting operation. An oil pump 24 is connected to the oil passage 22 through a control valve 23. An oil tank (not shown) is connected to the oil pump 24.

The cylinder halting mechanisms 21*a* and 21*b* are a hydraulically-actuated mechanism where lubricating oil discharged from the oil pump that is driven by the power of the crankshaft is used as operating oil. In the embodiment, a high-pressure operating oil activates the cylinder halting mechanism so that the operation of a corresponding cylinder(s) is halted, and a low-pressure operating oil deactivates the cylinder halting mechanism so that a corresponding cylinder(s) is operated. The control valve 23 switches the oil pressure acting on the first and second cylinder halting mechanisms 21*a* and 21*b* between a low pressure and a high pressure according to a control signal supplied from ECU 1, thereby switching between the operation (active state) and the halt (inactive state) for a desired cylinder(s).

These cylinder halting mechanisms can be formed by any known means. For example, JP-A No. 2005-105869 discloses a detailed configuration of such a cylinder halting mechanism.

In the embodiment, there are three operating modes. A first mode is an all-cylinder operation where all the intake valves and exhaust valves of the cylinders C1 to C6 are operated. A second mode is a one-cylinder halt operation where the intake valve and exhaust valve of the cylinder C4 of the second bank are halted. A third mode is a three-cylinder halt operation where the intake valves and exhaust valves of the three cylinders C1 to C3 of the first bank are halted. These operating modes are described by way of example, and the cylinder halting mechanism(s) may be configured such that various other operating modes are implemented.

When the all-cylinder operation, which is the first mode, is performed, the control valve 23 is controlled such that the cylinder halting mechanisms 21*a* and 21*b* are inactive by causing a low-pressure operating oil to act on both the cylinder halting mechanisms. When the one-cylinder halt operation, which is the second mode, is performed, a high-pressure operating oil acts on the cylinder halting mechanism 21*b* by the control valve 23 such that the cylinder halting mechanism 21*b* is active, and a low-pressure operating oil acts on the cylinder halting mechanism 21*a* by the control valve 23 such that the cylinder halting mechanism 21*a* is inactive. When the three-cylinder halt operation, which is the third mode is performed, a high-pressure operating oil acts on the cylinder halting mechanism 21*a* of the first bank by the control valve 23 such that the cylinder halting mechanism 21*a* is active, and a low-pressure operating oil acts on the cylinder halting mechanism 21*b* by the control valve 23 such that the cylinder halting mechanism 21*b* is inactive.

In response to input signals from the various sensors, the ECU 1 detects the operating condition of the engine 2 and generates a control signal for controlling the throttle valve 7 and the control valve 23 according to one or more programs and data (including one or more maps) which are stored in the memory.

Figure 2:
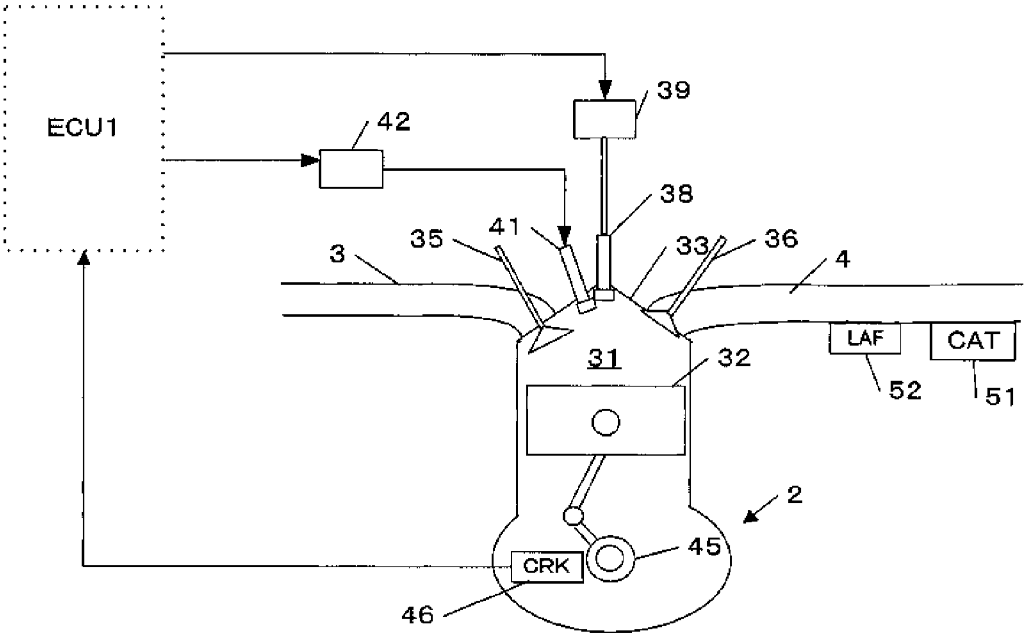
FIG. 2 schematically shows an internal combustion engine and a control apparatus according to one embodiment of the present invention.

FIG. 2 shows one of the cylinders mounted on the engine 2. In FIG. 2, the cylinder halting mechanisms of FIG. 1 are omitted. A combustion chamber 31 is formed between a piston 32 and a cylinder head 33. The combustion chamber 31 is coupled to the intake manifold 3 through the intake valve 35, and is coupled to the exhaust manifold 4 through the exhaust valve 36.

The engine 2 is a direct injection engine where fuel is directly injected into the combustion chamber 31. A fuel injection valve 38 is attached in such a manner as to protrude into the combustion chamber 31. The fuel injection valve 38 is connected to a high-pressure pump 39 and a fuel tank (not shown) through a common-rail (not shown). The high-pressure pump 39 boosts (increases) the pressure of fuel from the fuel tank, and then delivers the fuel to the fuel injection valve 38 through the common-rail. The fuel injection valve 38 injects the received fuel into the combustion chamber 31. The high-pressure pump 39 is controlled by a control signal supplied from ECU 1, which allows the injection pressure of fuel (hereinafter referred to as fuel pressure) to be changed. A fuel pressure sensor provided in the common-rail detects the fuel pressure, and the detection signal of the fuel pressure sensor is sent to ECU 1. A duration of the injection (that is, the amount of fuel to be injected) and a timing of the injection by the fuel injection valve 38 are controlled according to a control signal supplied from ECU 1.

An ignition plug 41 is attached in such a manner as to protrude into the combustion chamber 31. An ignition device 42 including an ignition coil supplies energy for ignition to the ignition plug 41, and the ignition plug 41 ignites an air-fuel mixture of the fuel from the fuel injection valve and intake air from the intake valve 35, at the ignition timing which follows a control signal supplied from ECU 1. The air-fuel mixture is burned by the ignition. The volume of the air-fuel mixture is increased due to the burning, which pushes the piston 32 downward. Reciprocating motion of the piston 32 is converted into rotational motion of a crankshaft 45.

A crank angle sensor 46 is provided in the engine 2. The crank angle sensor 46 outputs, to ECU 1, a CRK signal and a TDC signal which are pulse signals, according to the rotation of the crankshaft 45. The CRK signal is output at every predetermined crank angle. ECU 1 computes a rotational speed NE of the engine 2 in response to the CRK signal. The TDC signal is output at a crank angle associated with a top dead center (TDC) position of the piston 32.

An exhaust gas purifying device (catalyst) 51 is provided on the downstream of the collecting portion of the exhaust manifolds 4 of the cylinders in the engine 2. An air-fuel ratio (LAF) sensor 52 is provided on the upstream of the exhaust gas purifying device. The LAF sensor 52 linearly detects the air-fuel ratio in the range from lean to rich of the engine 2. The detection value of the air-fuel ratio sensor 52 is sent to ECU 1.

In the following description, one combustion cycle includes an intake stroke, a compression stroke, an expansion stroke, and an exhaust stroke. In the case of the direct injection engine, because the pressure of fuel is boosted and directly injected into the combustion chamber, the injection can be performed in any stroke in one combustion cycle. The inventors of the present application have focused on this point. When a cylinder is transited from the operating (active) condition to the halt (inactive) condition, a state where the intake and exhaust valves of the cylinder are still operated although the fuel injection into the cylinder has been stopped is detected. Hereinafter this state is referred to as "air cycle". The air cycle is a state where a deviation exists between the fuel injection stop timing and the intake/exhaust valve stop timing. By detecting the air cycle, it is predicted that the exhaust air-fuel ratio is leaned in the combustion cycle. Accordingly, additional fuel is injected in the same combustion cycle. By doing so, the lean exhaust air-fuel ratio caused by the air cycle state can be suppressed.

Figure 3:
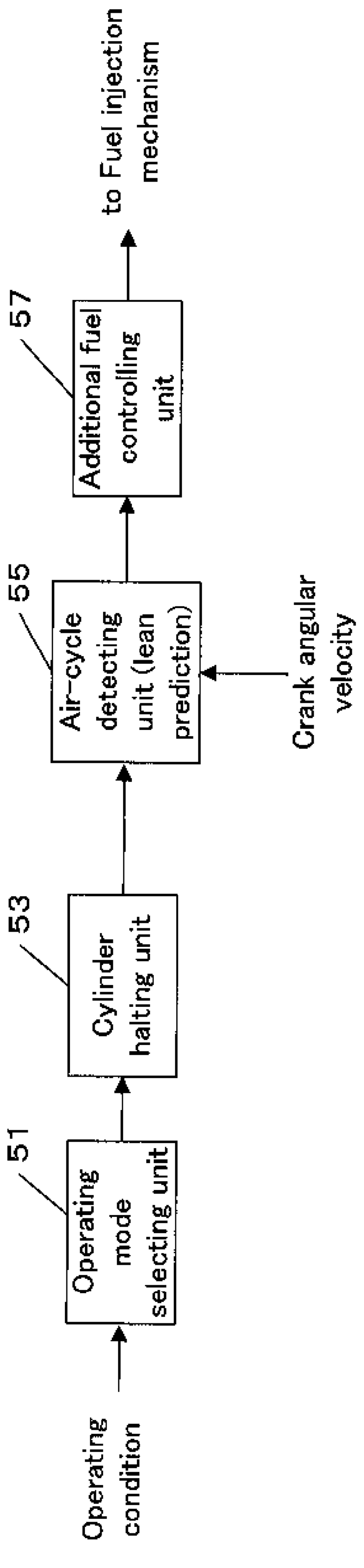
FIG. 3 is a block diagram showing a control apparatus according to one embodiment of the present invention.

FIG. 3 is a functional block diagram for a control apparatus according to an embodiment of the present invention. Each function may be implemented in the ECU 1. More specifically, each function may be implemented by the CPU executing one or more programs in the memory of the ECU 1.

An operating mode selecting unit 51 selects one of the first to third operating modes according to the operating condition of the engine 2. For example, an engine load is determined from a detection value of an accelerator sensor (not shown) which detects an opening degree of an accelerator pedal, and the operating mode can be selected based on the engine load and the engine rotational speed. The engine rotational speed can be computed from the detection value of the crank angle sensor 46 which detects the rotational angle position of the crankshaft. For example, the operating mode can be selected such that the number of operating (active) cylinders is increased as the load is increased or as the engine rotational speed is increased.

If there is a cylinder(s) whose operation is to be halted in response to the selected operating mode, a cylinder halting unit 53 performs a control such that fuel injection into the cylinder is stopped while the operation of the intake and exhaust valves of the cylinder is halted. For example, in the case where the first mode of the all-cylinder operation is switched to the third mode of the three-cylinder halt operation, the operation of the cylinders C1 to C3 is to be halted (deactivated). Accordingly, a control signal is sent to the fuel injection valve 38 such that the fuel injection to the cylinders C1-C3 are stopped, and a control signal is sent to the control valve 23 such that the operation of the intake and exhaust valves of the cylinders C1-C3 is stopped through the cylinder halting mechanism 21*a*.

An air cycle detection unit 55 computes an angular velocity (rad/sec) of the crankshaft 45 based on the crank pulse (CRK signal) supplied from the crank angle sensor 46. The angular velocity can be computed from a time interval between the issuance of the crank pulses.

Figure 4B:
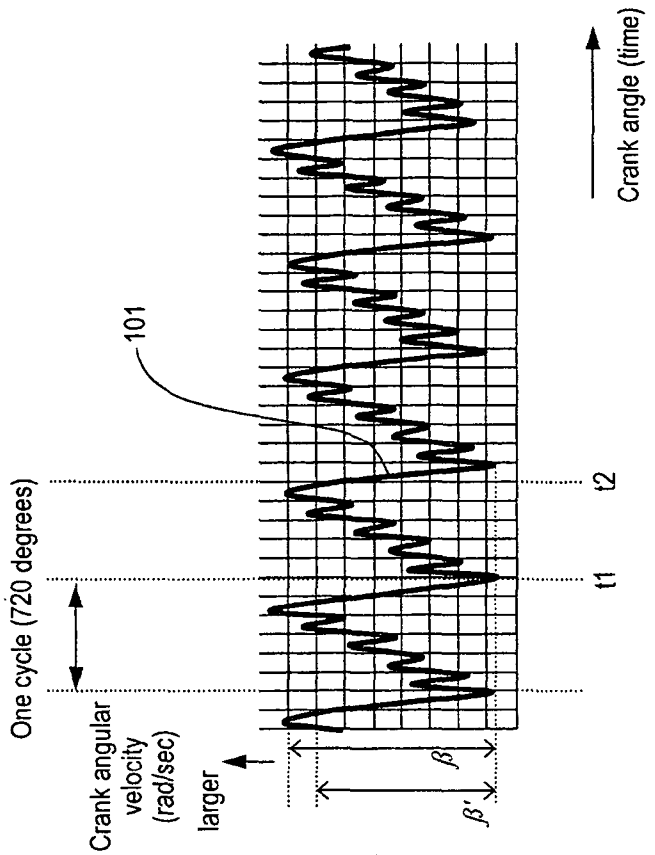
FIG. 4B shows a behavior of a crank angular velocity when one cylinder presents an air cycle state according to one embodiment of the present invention.
Figure 4A:
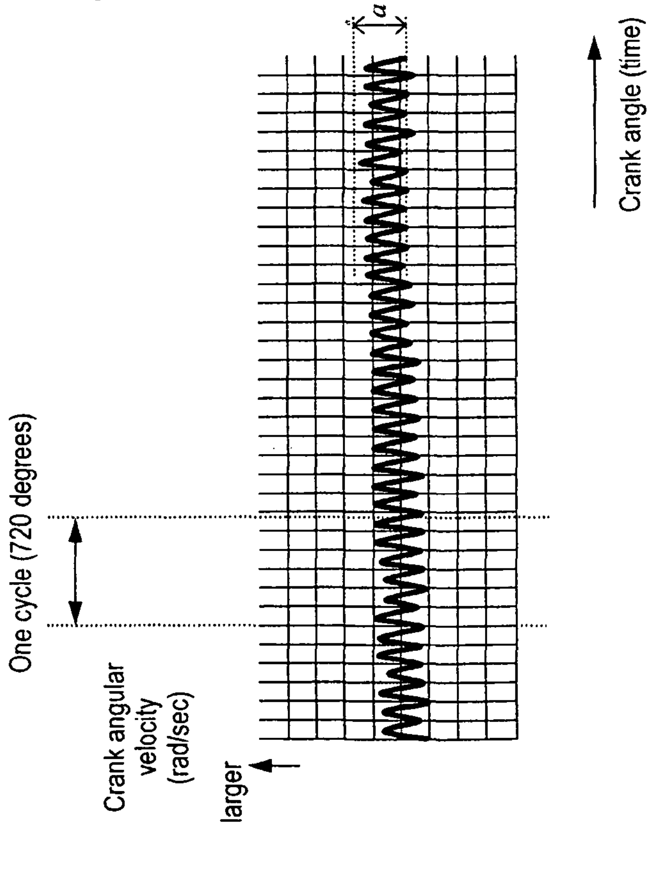
FIG. 4A shows a behavior of a crank angular velocity when all cylinders are operated according to one embodiment of the present invention.

FIG. 4A shows an example of a behavior of the crank angular velocity when all the cylinders are operated in the case of a six-cylinder engine. FIG. 4B shows an example of a behavior of the crank angular velocity when one cylinder is stopped from operating in the case of the six-cylinder engine. The graphs of FIGS. 4A and 4B are shown in the same scale. When all the cylinders are operated, the expansion of the air-fuel mixture occurs every 120 crank angle degrees in each cylinder by the ignition of the ignition device 42. Because the engine has the six cylinders, one cycle required to complete the six expansions is 720 crank angle degrees.

Each cylinder presents a behavior that the crank angular velocity is lowered after being temporarily raised by the expansion. Accordingly, as shown in FIG. 4A, such a behavior appears six times in one cycle (720 degrees). A height of the wave of the crank angular velocity substantially falls within a predetermined range as shown by $\alpha$.

On the other hand, FIG. 4B shows a state of the air cycle where the intake and exhaust valves are operated although the fuel supply is stopped for one of the six cylinders. In this example, the fuel supply is stopped for a sixth cylinder that is to be sixth exploded in one cycle. In one cycle starting from time t1, although the explosion of the sixth cylinder should be started at time t2, the explosion does not actually occur because the fuel supply is stopped. As can be seen from the reference numeral 101, the angular velocity is rapidly decreased without rise at time t2. It can be considered that the behavior indicated by the reference numeral 101 is identical to a misfire state. The amount of decrease $\beta$ of the crank angular velocity, caused by the stop of the fuel supply, is much larger than $\alpha$.

Thus, by monitoring the amount of decrease of the crank angular velocity, a state of the air cycle where the intake and exhaust operations are performed although the fuel supply is stopped can be detected.

Figure 5B:
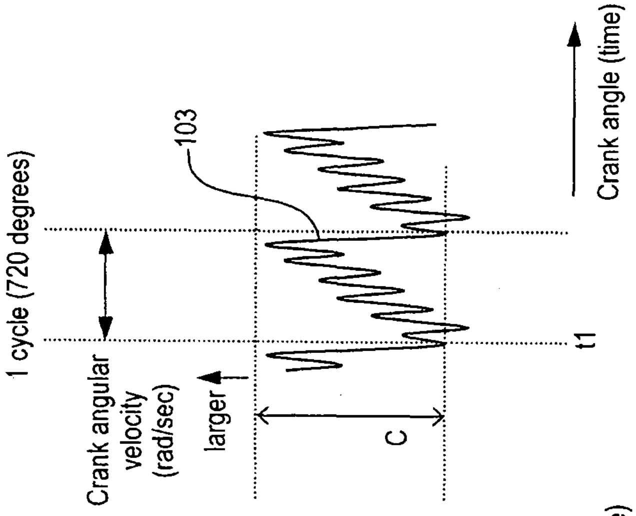
FIG. 5B shows a behavior of a crank angular velocity when fuel supply and intake/exhaust valves of one cylinder are stopped according to one embodiment of the present invention.
Figure 5A:
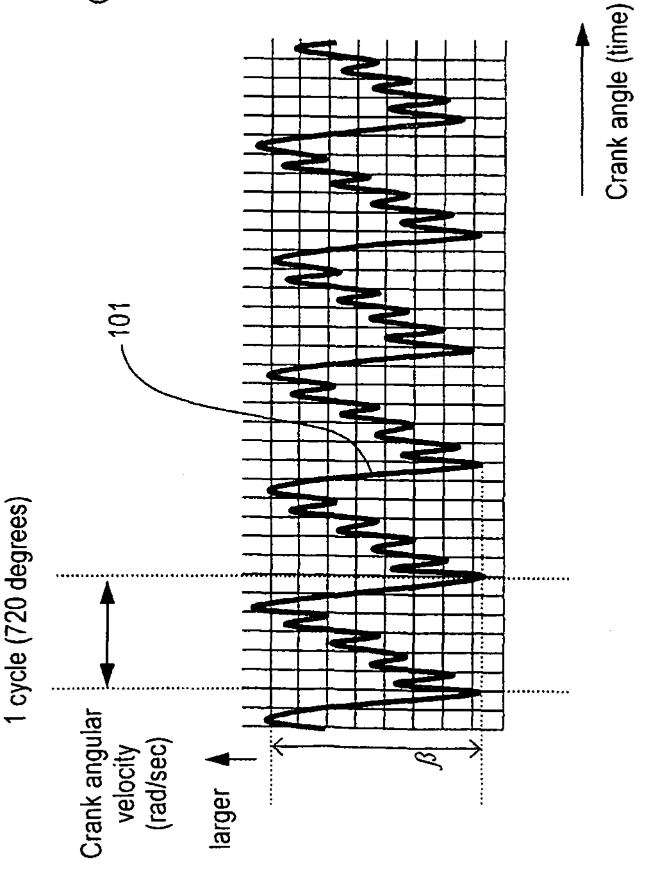
FIG. 5A shows a behavior of a crank angular velocity when one cylinder presents an air cycle state according to one embodiment of the present invention.

Referring to FIG. 5A, which is similar to FIG. 4B, a state of the air cycle where the intake and exhaust valves of one of the six cylinders are operated although the fuel supply to the cylinder is stopped is shown. On the other hand, FIG. 5B shows a state where the fuel supply to one of the six cylinders is stopped while the intake and exhaust valves of the cylinder are not operated. In FIG. 5B, because the fuel supply is stopped while the intake and exhaust operations are also stopped for the cylinder that is to be exploded sixth in one cycle starting from time t1, the crank angular velocity is decreased without rise as shown by the reference numeral 103. The amount of decrease is indicated by c. Here, the graphs of FIGS. 5A and 5B are shown in the same scale.

As is clear from the comparison of FIGS. 5A and 5B, the behavior of the crank angular velocities of FIGS. 5A and 5B have a similar waveform. However, in FIG. 5B, because the intake and exhaust operations are also stopped, the amount of decrease c of the crank angular velocity is smaller than the amount of decrease $\beta$ of the crank angular velocity of FIG. 5A where the intake and exhaust operations are performed.

Thus, the state of the air cycle where the intake and exhaust operations are performed although the fuel supply is stopped can be detected based on the amount of decrease of the crank angular velocity, distinguishably from the state where the intake and exhaust operations are stopped while the fuel supply is stopped.

Referring back to FIG. 3, the air cycle detecting unit 55 detects the air cycle based on the amount of decrease of the angular velocity. In one embodiment, a change in the crank angle is computed at predetermined time intervals, and the magnitude (absolute value) of the change is integrated over a period during which the change is in the decrease direction, thereby computing the amount of decrease. If the amount of decrease exceeds a predetermined threshold, it is determined that the air cycle has occurred. From the crank angular velocity range where the amount of decrease is computed, it can be determined which cylinder the air cycle has occurred in.

The threshold may be determined by simulation or the like. In FIG. 4, the threshold is set larger than $\alpha$ and smaller than $\beta$. As shown in FIG. 5, preferably the threshold is set larger than c. Thus, the rapid decrease in the crank angular velocity as shown by the reference numeral 101 can be detected.

Alternatively, only the crank angular velocity for the cylinder(s) to be halted may be monitored. For example, in the case where the first to third cylinders are halted, the crank angular velocities respectively corresponding to the first to third cylinders are monitored, and it is determined that the air cycle has occurred if the amount of change in the decrease direction exceeds a predetermined threshold. In FIG. 4B, when the amount of decrease $\beta'$ of the cylinder that is to be exploded sixth in the range of the 120 crank angle degrees from time t2 is larger than the predetermined threshold, it can be determined that the air cycle has occurred in the cylinder. The threshold in such a case can be also determined by simulation or the like.

Figure 6:
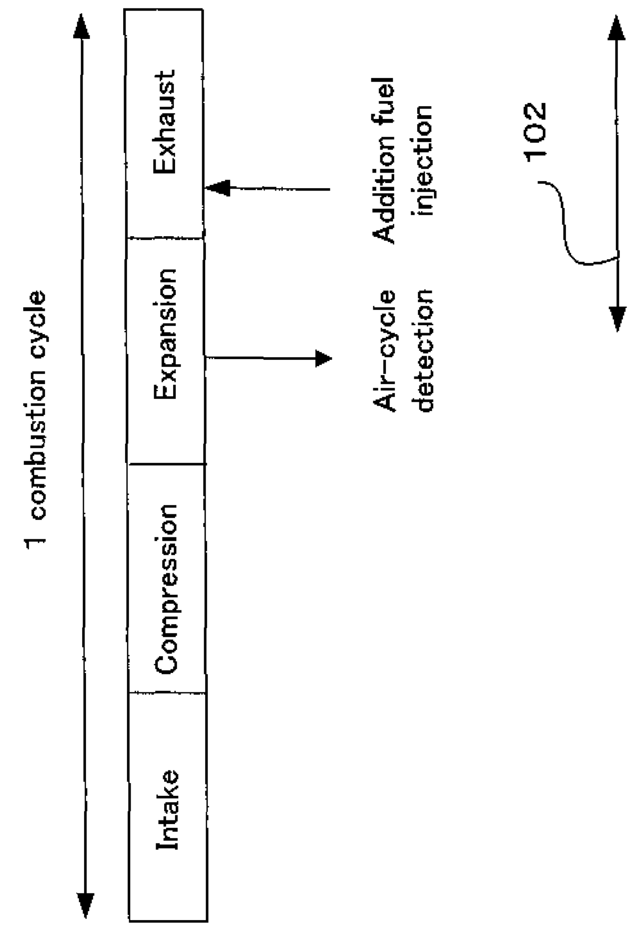
FIG. 6 schematically shows air cycle detection timing and additional fuel injection timing according to one embodiment of the present invention.

In a combustion cycle where the air cycle has occurred, it is predicted that the air-fuel ratio of the internal combustion engine is leaned due to the air exhausted in the subsequent exhaust stroke. For example, as shown in FIG. 4B, it is assumed that the air cycle has occurred in the sixth cylinder. FIG. 6 shows the combustion cycle of the cylinder, and the air cycle is detected in the expansion stroke after the ignition. In the exhaust stroke of the same combustion cycle, the exhaust valve is opened to exhaust the gas in the combustion chamber. The exhausted gas is merely air because fuel is not supplied. Accordingly, the air-fuel ratio of the internal combustion engine becomes lean, which may lower the emission.

In order to prevent the above lean air-fuel ratio, an additional-fuel controlling unit 57 is provided as shown in FIG. 3. In response to the detection of the air-cycle, the additional-fuel controlling unit 57 controls the fuel injection valve such that additional fuel is injected during the same combustion cycle where the air-cycle has been detected. In FIG. 6, the additional fuel is injected in the exhaust stroke after the detection of the air cycle. Therefore, the additional fuel is exhausted to the exhaust manifold along with the air in the combustion chamber in the exhaust stroke. As a result, making the air-fuel ratio lean can be suppressed.

The additional fuel injection is not limited to the exhaust stroke. The additional fuel can be injected after the detection of the air cycle. For example, as shown by the reference numeral 102, the additional fuel can be injected at any appropriate time in the period from the latter half of the expansion stroke to the exhaust stroke.

Preferably the additional-fuel controlling unit 57 computes the amount of additionally-supplied fuel such that the theoretical air-fuel ratio is achieved. The lowering of the emission can be more surely suppressed by the exhaust of the theoretical air-fuel ratio. In one embodiment, by referring to a map, which is for realizing the theoretical air-fuel ratio, based on the intake air amount detected by the air flow meter 8 (FIG. 1), a corresponding fuel injection amount is determined. The fuel injection valve 38 is controlled such that the determined amount of fuel is injected.

Figure 7:
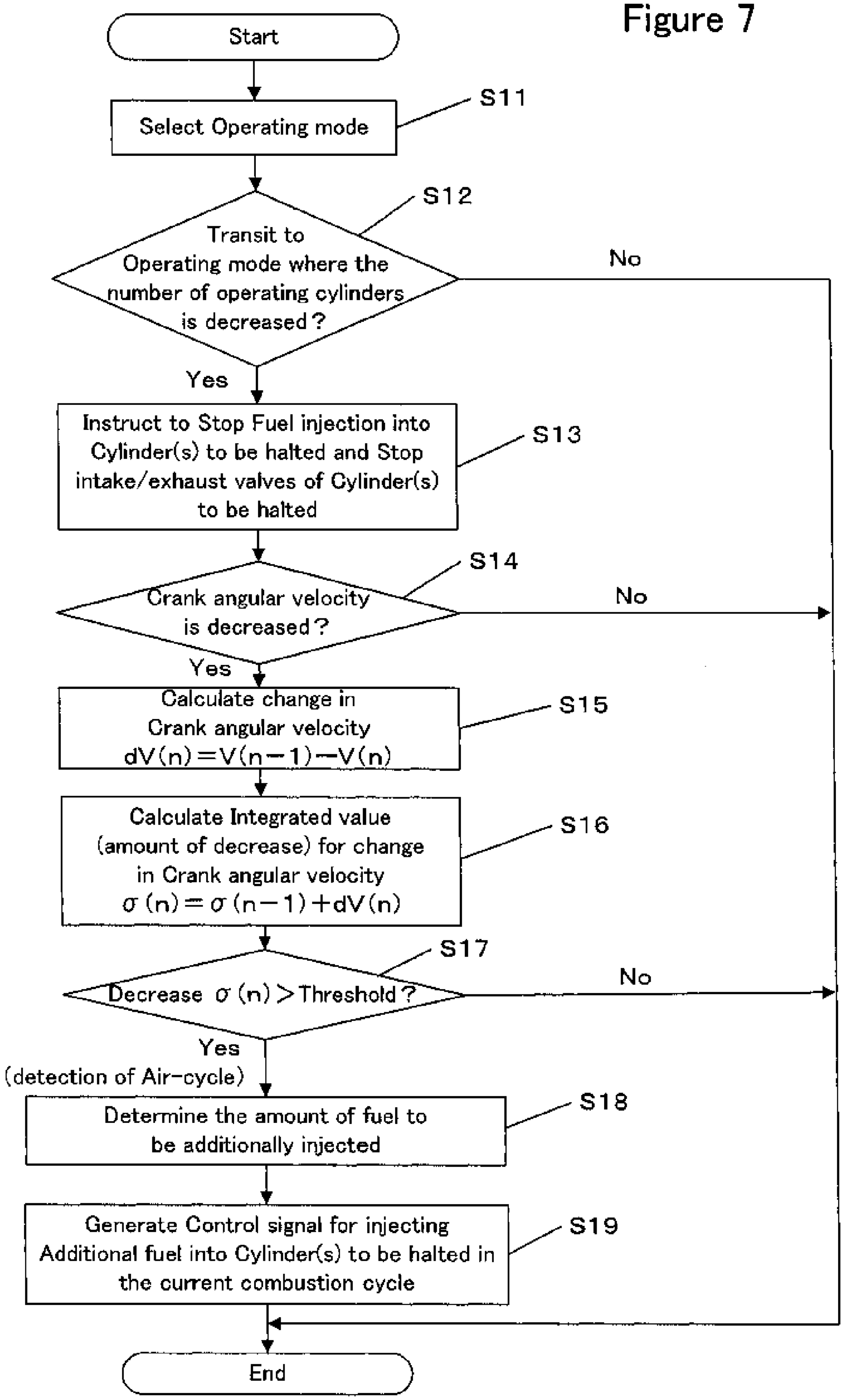
FIG. 7 is a flowchart showing a control process according to one embodiment of the present invention.

FIG. 7 is a flowchart showing a control process according to one embodiment of the present invention. The process may be performed at predetermined time intervals by the CPU of the ECU 1. More specifically, the process may be performed by each functional block shown in FIG. 3.

In step S11, the operating mode is selected based on the operating condition of the engine. As described above, although one of the first to third operating modes is selected in this embodiment, the present invention is not limited to the first to third operating modes.

In step S12, it is determined whether or not the number of operating cylinders is to be decreased by the selected operating mode. In other words, it is determined whether or not the number of halted cylinders is to be increased. If the answer of the step S12 is YES, it indicates that a newly-halted cylinder exists. Therefore, in step S13, a control signal for stopping the fuel injection is sent to the fuel injection valve of the cylinder(s) to be halted, and a control signal for stopping the operations of the intake and exhaust valves through the cylinder halting mechanisms 21*a* or 21*b* is sent to the control valve 23.

In step S14, it is determined whether or not the angular velocity of the crankshaft is decreased. If the angular velocity is decreased, a change in the decrease direction is computed in step S15. More specifically, a change in the decrease direction is determined by computing a difference dV between a previously-detected angular velocity $V(n-1)$ and a currently-detected angular velocity $V(n)$. In step S16, the currently-computed change $dV(n)$ is added to a previous value $\sigma(n-1)$ of the integrated value for the change to compute the current value of the integrated value for the change, that is, the amount of decrease $\sigma(n)$.

Alternatively, as described above, the computation may be performed for only the cylinder(s) to be halted in steps S14 to S16.

In step S17, it is determined whether or not the amount of decrease of the crank angular velocity computed in step S16 is larger than a predetermined threshold. If the answer of the step S17 is YES, it indicates that the air cycle has been detected. Therefore, it is predicted that the exhaust air-fuel ratio is leaned.

In step S18, the amount of fuel that is to be additionally injected is determined. As described above, preferably the additional injection fuel amount is determined such that the theoretical air-fuel ratio is implemented. In step S19, a control signal for driving the fuel injection valve is generated such that the determined additional fuel amount is injected at a predetermined timing in the current combustion cycle (that is, in the combustion cycle where the air cycle has been detected). The predetermined timing may be pre-defined, or the predetermined timing may be determined according to some operating condition, for example, such that injection is performed in the predetermined period 102 of FIG. 6 from the latter half of the expansion stroke to the exhaust stroke.

Thus, even if a deviation occurs between the fuel injection stop timing and the intake/exhaust valve stop timing for a cylinder to be halted, additional fuel is injected into the subject combustion cycle in response to the detection of the air cycle, so that the lowering of the emission caused by the lean exhaust air-fuel ratio can be prevented.

Although the three operating modes exist in the above embodiments, the present invention is not limited to such three operating modes. For example, two operating modes including the all-cylinder operation and the partial operation where a part of the plurality of cylinders is halted may be used, or more than three operating modes may be used. The present invention is not limited to the six-cylinder engine, but the present invention can be applied to an engine having any number of cylinders. As to which cylinder of which bank is to be halted, the present invention is not limited to the above embodiments, but another design can be adopted. The direct injection engine of the above embodiments may be either a gasoline engine or a diesel engine.

The present invention can be applied to a general-purpose internal combustion engine such as an outboard motor.

What is claimed is:

1. A control apparatus for an internal combustion engine, wherein the engine comprises one or more combustion chambers, each chamber having a fuel injection valve for directly injecting fuel into the chamber, each chamber having an ignition device for burning an air-fuel mixture containing the fuel injected from the fuel injection valve, and wherein the control apparatus includes a variable cylinder management mechanism that is capable of changing the number of operating cylinders, and a control unit; the control unit being configured to:

make a transition to an operating mode where the number of operating cylinders is decreased through the variable cylinder management mechanism by performing a control such that fuel injection into the cylinder(s) to be halted is stopped and the operation of either an intake valve or an exhaust valve, or both, on each of the cylinder(s) to be halted is stopped;

predict, based on an operating condition of the engine, a state where an air-fuel ratio of an exhaust atmosphere of the engine becomes lean during the transition due to a stop of the fuel injection into one or more cylinders to be halted, but whose intake and exhaust valves have yet to stop, wherein the operating condition of the engine is a condition where, with respect to each of the one or more cylinders to be halted, the intake and exhaust valves still operate although the fuel injection has been stopped;

compare an integrated value of a change in a crank angular velocity of the engine with a threshold;

determine a state where the air-fuel ratio of the exhaust atmosphere becomes lean if the integrated value is larger than the threshold; and if it is predicted that the air-fuel ratio of the exhaust atmosphere becomes lean, cause the fuel injection valve to inject additional fuel to the one or more-cylinders to be halted after ignition performed by the ignition device in a combustion cycle where the prediction was made, wherein the additional fuel is injected such that said additional fuel is exhausted to an exhaust manifold along with the air in the corresponding combustion chamber during the combustion cycle where the prediction was made.

2. The control apparatus of claim 1, wherein the additional fuel is determined such that the exhaust atmosphere becomes a theoretical air-fuel ratio.

3. A method for controlling an internal combustion engine, wherein the engine comprises one or more combustion chambers, each chamber having a fuel injection valve for directly injecting fuel into the chamber, each chamber having an ignition device for burning an air-fuel mixture containing the fuel injected from the fuel injection valve, and wherein the control apparatus includes a variable cylinder management mechanism that is capable of changing the number of operating cylinders, comprising:

making a transition to an operating mode where the number of operating cylinders is decreased through the variable cylinder management mechanism by performing a control such that fuel injection into the cylinder(s) to be halted is stopped and the operation of either an intake valve or an exhaust valve, or both, on each of the cylinder(s) to be halted is stopped;

predicting, based on an operating condition of the engine, a state where an air-fuel ratio of an exhaust atmosphere of the engine becomes lean during the transition due to a stop of the fuel injection into one or more cylinders to be halted, but whose intake and exhaust valves have yet to stop, wherein the operating condition of the engine is a condition where, with respect to each of the one or more cylinders to be halted, the intake and exhaust valves still operate although the fuel injection has been stopped;

comparing an integrated value of a change in a crank angular velocity of the engine with a threshold;

determining a state where the air-fuel ratio of the exhaust atmosphere becomes lean if the integrated value is larger than the threshold; and if it is predicted that the air-fuel ratio of the exhaust atmosphere becomes lean, causing the fuel injection valve to inject additional fuel to the one or more cylinders to be halted after ignition performed by the ignition device in a combustion cycle where the prediction was made, wherein the additional fuel is injected such that said additional fuel is exhausted to an exhaust manifold along with the air in the corresponding combustion chamber during the combustion cycle where the prediction was made.

4. The method of claim 3, wherein the additional fuel is determined such that the exhaust atmosphere becomes a theoretical air-fuel ratio.

5. A computer program embodied on a computer readable medium for controlling an internal combustion engine, wherein the engine comprises one or more combustion chambers, each chamber having a fuel injection valve for directly injecting fuel into the chamber, each chamber having an ignition device for burning an air-fuel mixture containing the fuel injected from the fuel injection valve, and wherein the control apparatus includes a variable cylinder management mechanism that is capable of changing the number of operating cylinders, comprising the steps of:

making a transition to an operating mode where the number of operating cylinders is decreased through the variable cylinder management mechanism by performing a control such that fuel injection into the cylinder(s) to be halted is stopped and the operation of either an intake valve or an exhaust valve, or both, on each of the cylinder(s) to be halted is stopped;

predicting, based on an operating condition of the engine, a state where an air-fuel ratio of an exhaust atmosphere of the engine becomes lean during the transition due to a stop of the fuel injection into one or more cylinders to be halted, but whose intake and exhaust valves have yet to stop, wherein the operating condition of the engine is a condition where, with respect to each of the one or more cylinders to be halted, the intake and exhaust valves still operate although the fuel injection has been stopped;

comparing an integrated value of a change in a crank angular velocity of the engine with a threshold;

determining a state where the air-fuel ratio of the exhaust atmosphere becomes lean if the integrated value is larger than the threshold; and if it is predicted that the air-fuel ratio of the exhaust atmosphere becomes lean, causing the fuel injection valve to inject additional fuel to the one or more cylinders to be halted after ignition performed by the ignition device in a combustion cycle where the prediction was made, wherein the additional fuel is injected such that said additional fuel is exhausted to an exhaust manifold along with the air in the corresponding combustion chamber during the combustion cycle where the prediction was made.

6. The computer program of claim 5, wherein the additional fuel is determined such that the exhaust atmosphere becomes a theoretical air-fuel ratio.

* * * * *